United States Patent [19]

Tighe et al.

[11] 4,129,493
[45] Dec. 12, 1978

[54] SWIMMING POOL CHLORINATOR SYSTEM

[75] Inventors: Michael R. Tighe, Mentor; Hugh L. McCutchen, Chardon, both of Ohio

[73] Assignee: Diamond Shamrock Corporation, Cleveland, Ohio

[21] Appl. No.: 811,989

[22] Filed: Jun. 30, 1977

[51] Int. Cl.² ............... C25B 15/02; C25B 9/00; C25B 1/26; E04H 3/20

[52] U.S. Cl. .................. 204/228; 204/151; 204/263; 204/95; 210/138; 210/169; 210/259; 210/287

[58] Field of Search ............ 204/151, 257, 263, 296, 204/96, 128, 228, 95, 149; 210/169, 138, 259, 287

[56] References Cited

U.S. PATENT DOCUMENTS

| | | | |
|---|---|---|---|
| 3,351,542 | 11/1967 | Oldershaw et al. | 210/169 X |
| 3,458,414 | 7/1969 | Crane et al. | 204/151 X |
| 3,669,857 | 6/1972 | Kirkham et al. | 210/169 X |
| 3,887,499 | 6/1975 | Hodgdon, Jr. | 204/296 X |
| 4,025,405 | 5/1977 | Dotson et al. | 204/296 X |

Primary Examiner—John H. Mack
Assistant Examiner—D. R. Valentine
Attorney, Agent, or Firm—Stephen A. Littlefield

[57] ABSTRACT

A new and improved swimming pool chlorinator which facilitates the provision of a higher strength hypochlorite solution over a wide concentration range than can be obtained from prior swimming pool chlorinators. The new and improved chlorinator utilizes a membrane type cell having opposed catholyte and anolyte chambers including a cathode and an anode member, respectively, disposed in a close spaced relationship to each other and separated by a substantially hydraulically impermable cation exchange membrane. The products of electrolysis in the catholyte and anolyte chambers are combined exteriorly of the cell to obtain sodium hypochlorite which may then be conveyed to the swimming pool water. Means are provided to selectively vary the electrical current in the cell to control the amount of sodium hydrochlorite ultimately produced.

3 Claims, 3 Drawing Figures

U.S. Patent    Dec. 12, 1978    4,129,493
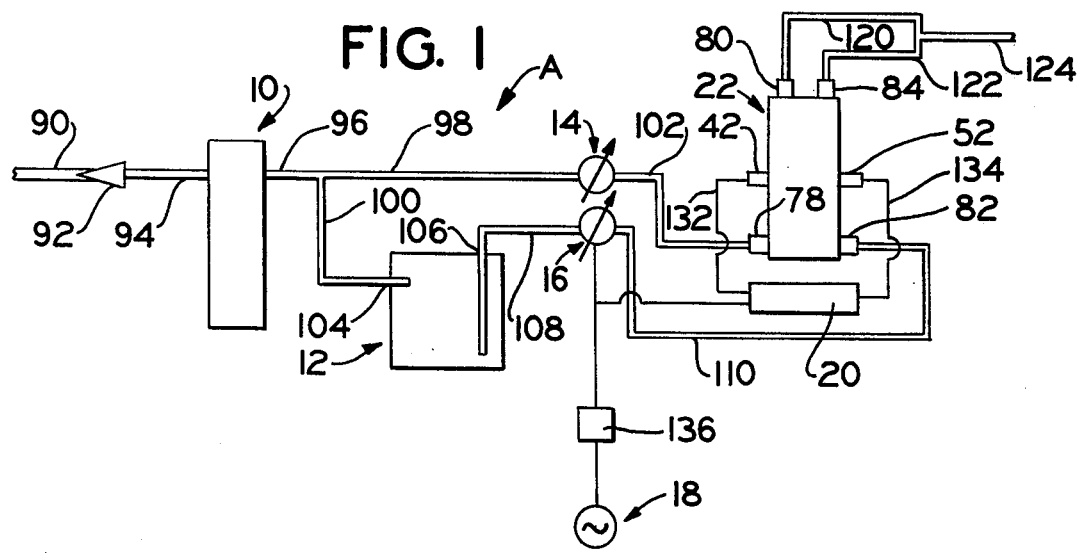
FIG. 1
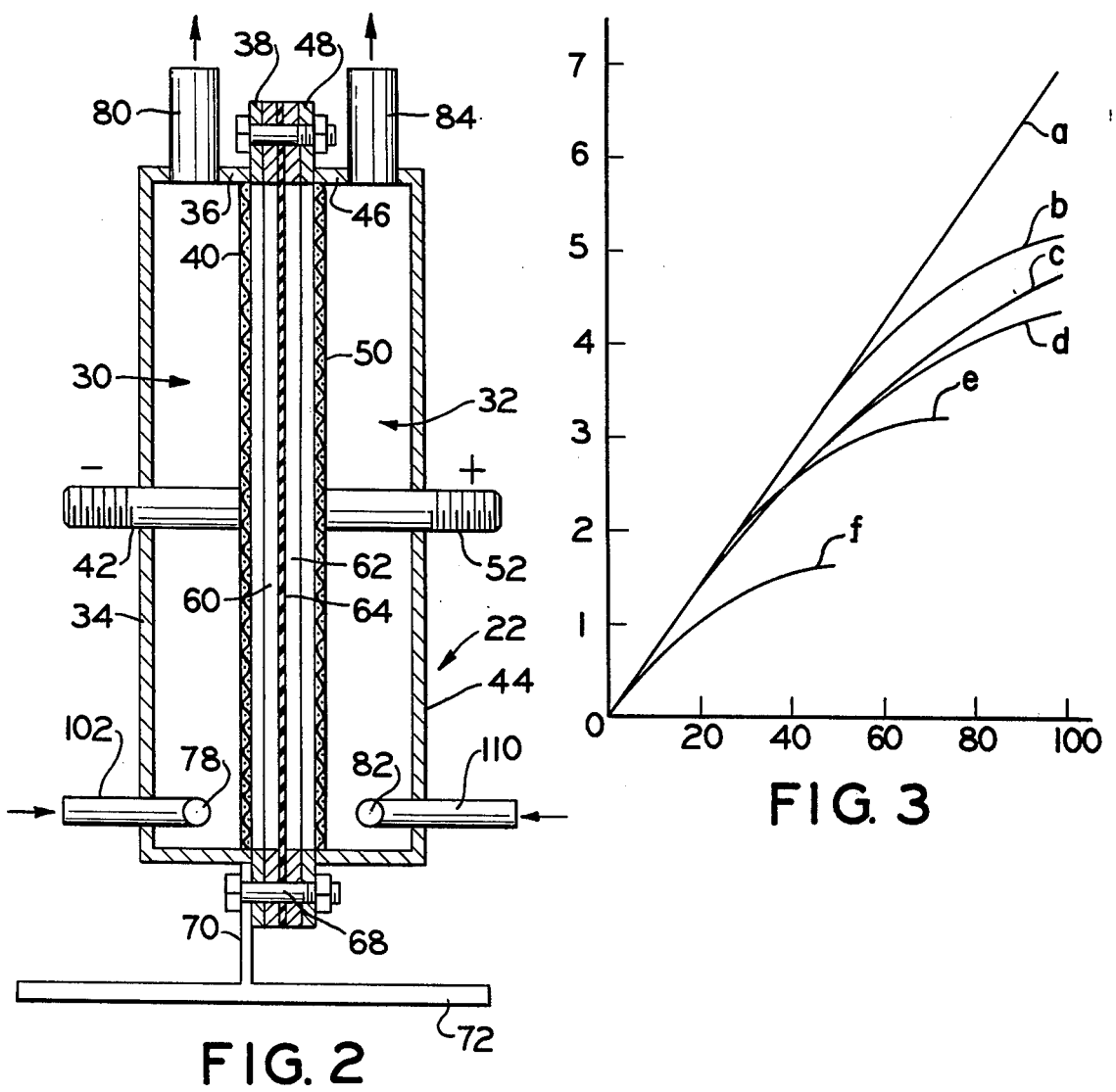
FIG. 2
FIG. 3

SWIMMING POOL CHLORINATOR SYSTEM

BACKGROUND OF THE INVENTION

This invention pertains to the art of chlorine producing devices and more particularly to swimming pool chlorinators.

The invention is particularly applicable to a swimming pool chlorinator which employs a membrane type electrolytic cell and will be described with particular reference to a single monopolar type cell; however, it will be appreciated by those skilled in the art that the invention has broader applications and may find advantageous use in other environments.

Chlorine has been used for some time as a biocidally active agent for use with water in swimming pools. In the past, this has been done largely with chemical treatment of such water by chemical compounds such as a hypochlorite compound. The addition of chemical compounds to effect the biocidal activity desired has become costly and due to restrictions which may be placed upon the traffic of these chemical products, on-site manufacture of such compounds or different means by which such treatment may be carried out must be developed.

Electrochemical methods of manufacture present one solution to this problem due to their capability for small onsite production at a reasonable cost, greater ecological acceptability and potential for energy conservation. Furthermore, electrochemical methods of manufacture can generally be operated as a closed system thereby allowing greater control over the escape of by-products or wastes which may be environmentally undesirable. Improved electrolytic cells which operate at minimum power consumption are especially important because of the rapidly rising price and expected exhaustion of fossil fuels.

A number of types and styles of swimming pool chlorinators utilizing electrolytic cells have heretofore been available for use. However, and even though these prior chlorinators have provided improved results over other known chlorinating systems, they still have had disadvantages in practical application. For example, use has heretofore been made of a swimming pool chlorinator which included an electrolytic cell having a plurality of bipolar electrodes separated by porous asbestos diaphragms. Tests on this type of unit have shown that it is very inefficient in operation and, therefore, has a low production rate of sodium hypochlorite. In addition, such systems suffer from the fact that asbestos particles can be removed from the diaphragm and carried into the swimming pool water. Obviously, this is not desirable and is to be avoided, if possible. Moreover, with some other types of propr chlorinators where the chlorine is injected directly into the pool, the pool owner must dispose of the co-produced sodium hydroxide. This is a corrosive and potentially dangerous chemical.

Further experimental efforts on a small membrane cell showed that this type of cell had good efficiency and chlorine production. Therefore, it was deemed to be exceedingly advantageous to develop an on-site swimming pool chlorinator utilizing a membrane type electrolytic cell for the ultimate generation of sodium hypochlorite. Selective amounts thereof so generated could then be added to the swimming pool water as a biocidally active agent for controlling bacteria and the like therein.

BRIEF DESCRIPTION OF THE INVENTION

In accordance with the present invention, there is provided an improved swimming pool chlorinator of the type employing an electrolytic cell for producing chlorine and caustic with at least the chlorine thereafter mixed with the swimming pool water. The improvement comprises use of a membrane type electrolytic cell having opposed catholyte and anolyte chambers including a cathode and an anode member, respectively, with the members disposed in a close spaced relationship to each other and separated by a substantially hydraulically impermeable cation exchange membrane. The catholyte chamber includes an inlet for receiving water therein in communication with the cathode and an outlet discharging sodium hydroxide as well as the other by-products therefrom during cell operation. The anolyte chamber includes an inlet for receiving a saturated brine solution therein in communication with the anode and an outlet for discharging chlorine as well as other by-products therefrom during cell operation. Means are also provided for interconnecting the catholyte and anolyte chamber outlets to each other externally of the cell such that the individual products of electrolysis may be mixed to form sodium hypochlorite which may then be introduced into the swimming pool water.

In accordance with another aspect of the present invention, means are included for selectively varying the crrent flowing through the cell for controlling the amount of sodium hypochlorite ultimately produced and introduced into the swimming pool.

In accordance with a further aspect of the present invention, there is provided a new swimming pool chlorinator system. The system includes an ion exchange column having an inlet for receiving a supply of water therein and an outlet for discharging deionized water therefrom. A briner adjacent the ion exchange column is adapted to receive a portion of the deionized water and convert that water to a saturated brine solution. An electrolytic membrane cell is disposed adjacent the ion exchange column. This cell has opposed catholyte and anolyte chambers including a cathode and an anode member, respectively, with these members disposed in a close spaced relationship to each other and separated by a substantially hydraulic impermeable cation exchange membrane. The catholyte chamber includes an inlet for receiving a portion of the deionized water discharged from the ion exchange column oulet therein in communication with the cathode and an outlet for discharging sodium hydroxide as well as other by-products therefrom during system operation. The anolyte chamber includes an inlet for receiving the saturated brine solution from the briner therein in communication with the anode and an outlet for discharging chlorine as well as other by-products during system operation. Means are included for supplying a voltage differential across the cathode and anode to effect a current flow through the cell and effect electrolysis therein. Means are also provided for interconnecting the catholyte and anolyte chamber outlets externally of the cell so that the individual products of electrolysis discharged from the cell therethrough may be mixed to form sodium hypochlorite as well as other by-products which may then be introduced into the swimming pool water.

The principal object of the present invention is the provision of a new and improved swimming pool chlorinator.

Another object of the present invention is the provision of a new and improved swimming pool chlorinator which is efficient in operation and selectively controllable for providing the necessary and/or desirable sodium hypochlorite output.

Still another object of the present invention is the provision of a new and improved on-site swimming pool chlorinator which utilizes a membrane type electrolytic cell.

Other objects and advantages for the subject invention will become apparent to those skilled in the art upon a reading and understanding of this specification.

BRIEF DESCRIPTION OF THE DRAWINGS

The invention may take physical form in certain parts and arrangements of parts, a preferred embodiment of which will be described in detail in the specification and illustrated in the accompanying drawings which form a part hereof and wherein:

FIG. 1 is a schematic or block diagram view of the subject swimming pool chlorinator system;

FIG. 2 is an enlarged and more specific view of the particular electrolytic cell used in the overall chlorinator system; and, FIG. 3 is a graph showing operational results obtained from using the concepts of the subject invention.

DESCRIPTION OF THE PREFERRED EMBODIMENT

Referring now to the drawings wherein the showings are for purposes of illustrating the preferred embodiment of the invention only and not for purposes of limiting same, FIG. 1 shows the subject new swimming pool chlorinator system A. The system is comprised of a number of major components including an ion exchange column 10, a briner 12, pumps 14, 16, an electrical energy source 18, a rectifier 20 and a membrane type electrolytic cell 22. Some of the specifics of these components as well as the interrelationships therebetween will be described in greater detail hereinafter. However, as many of these components are conventional in nature, a detailed description of each is not required in order to appreciate the overall inventive concepts involved.

Particular attention is invited to FIG. 2 for a more specific showing of electrolytic cell 22. This cell is deemed to be particularly advantageous to the overall successful operation of the subject system and comprises what is now commonly referred to as a monopolar type of cell. In the preferred arrangement of the present invention here under discussion, a single electrolytic cell is employed and is comprised of a catholyte chamber 30 and an anolyte chamber 32 which are positioned in an opposed relationship to each other.

Catholyte chamber 30 is defined by a bottom wall 34 and a continuous peripheral side wall 36 having an outwardly extending peripheral flange 38 at the distal end thereof spaced remote from the bottom wall. Thus, catholyte chamber 30 has a generally bin-like configuration which includes an outwardly extending flange at the open end thereof. In the arrangement here under discussion, the catholyte chamber is constructed from steel in order to achieve the desired electrolytic operation as will hereinafter be described. Further, in this specific arrangement, the catholyte chamber is configured to have a volume of approximately 800 ml.

A cathode member generally designated 40 and preferably constructed from an unflattened steel or nickel mesh is disposed in the catholyte chamber adjacent the open end thereof at peripheral flange 38. In the preferred embodiment, the cathode has an area of 49 sq. in. An electrical connection bus or terminal 42 is disposed at bottom wall 34 into physical communication with cathode 40 and adapted to be connected to the negative (−) side of a source of direct current electrical energy for supplying such energy to the cathode member as will hereinafter be more fully appreciated. The arrangement of bus or terminal 42 has only been generally schematically shown, it being understood that other known and conventional arrangements could also be used without in any way departing from the overall concepts of the present invention.

Anolyte chamber 32 is substantially a mirror image of the catholyte chamber and includes a bottom wall 44 and a continuous peripheral side wall 46 having a peripheral outwardly extending flange 48 at the distal end thereof spaced remote from the bottom wall. The anolyte chamber is constructed from titanium, again, to facilitate the desired electrolytic action within the cell itself. The anolyte chamber also has a volume of approximately 800 ml in the preferred embodiment here under discussion.

An anode 50 constructed from unflattened mesh is disposed at the open end thereof adjacent flange 48. This mesh may be conveniently constructed from any number of conventional anode materials such as titanium or coated titanium of the dimensionally stable type. The anode also has a preferred area of 49 sq. in. As will be noted in FIG. 2, cathode 40 and anode 50 are disposed in a generally close spaced parallel relationship to each other in order to efficiently effect the desired electrolytic activity in the cell during operation thereof. The close spaced relationship between the cathode and anode requires lower cell operating voltages to thereby aid in minimizing the cost of cell operation. A terminal or bus 52 is disposed in communication with bottom wall 44 of the anolyte chamber extending into communication with bottom wall 44 of the anolyte chamber extending into communication with anode 50 and adapted to be connected to the positive (+) side of a source of electrical energy for supplying such energy to the anode member. As with the arrangement for terminal or bus 42, terminal or bus 52 may be connected to the anode by other means and in other manners.

A pair of neoprene gaskets 60, 62 are disposed between peripheral flanges 38, 40 of the catholyte and anolyte chambers. These gaskets are configured so that they have an open center area and generally mate with each other and the flanges at only the flange areas themselves. Disposed between neoprene gaskets 60, 62 generally parallel to cathode 40 and anode 50 is a substantially hydraulically impermeable cation exchange membrane 64. This membrane extends across the open ends of chambers 30, 32 and acts to separate the anode and cathode as well as the chambers themselves.

Membrane 64 may be comprised of any number of substantially hydraulically impermeable cation exchange membranes which are chemically resistant to the cell anolyte and liquor, have low resistivity, resist forward migration of chloride ions and resist back migration of hydroxide ions. The type of material used for membrane 64 must be small cation permeable so that only sodium ions will migrate therethrough and migration of virtually all of the larger cations such as the metal impurities of the cell liquor and the like will be prevented. The use of these materials for membrane 64 will result in ultimately providing sodium hypochlorite having a higher concentration. Hydraulically impermeable cation exchange membranes of the type herein involved are generally described, for example, in prior U.S. Pat. Nos. 3,041,371; 3,282,875; and, 3,624,053. In the preferred arrangement of the present invention, however, the membrane is commercially available from E. I. Dupont de Nemours and Co. under the trademark NAFION and is reinforced by means and for reasons known in the art.

A plurality of conventional mechanical fasteners 68 are employed to assemble catholyte and anolyte chambers 30,32 together at flanged areas 38,48 with neoprene gaskets 60,62 and membrane 64 interposed therebetween. These mechanical fasteners may be advantageously disposed about the peripheries of the chambers as generally shown in FIG. 2 and may be constructed of a non-conductive material such as plastic or the like or conveniently insulated from contact with flanges 38, 48 to prevent electrical shorting between the cell components. The neoprene gaskets prevent liquor leakage from the cell and as shown, at least some of these fasteners may be advantageously employed to mount the cell to a mounting flange 70 which itself is a part of a mounting base 72 for positioning the cell in a preferred upright manner.

Catholyte chamber 30 further includes an inlet 78 disposed adjacent the lowermost portion thereof for receiving deionized water therein and an outlet 80 adjacent the uppermost area thereof for discharging the products of electrolysis from that chamber. Similarly, anolyte chamber 32 includes an inlet 82 disposed adjacent the lowermost area thereof for receiving a saturated brine solution and an outlet 84 adjacent the uppermost area thereof for discharging the products of electrolysis from that chamber. The specifics of cell operation in the overall system will be described hereinafter in further detail.

Referring again to FIG. 1, description will hereinafter be made to operation of the overall new and improved swimming pool chlorinator system which forms the present invention. As shown therein, a line 90 is connected to a supply of water under pressure. Typically, the water pressure will be 60 psi so that a pressure reducer generally designated 92 is included in line 90 to reduce the pressure to approximately 5 psi. Once the pressure has been reduced, the water is conveyed by line 94 to an inlet in ion exchange column 10. The structure of this ion exchange column is conventional so that further elaboration thereon is deemed unnecessary for those skilled in the art to appreciate the invention thereof.

Deionized water is discharged outwardly from ion exchange column 10 through line 96 which is then branched so that a portion of the deionized water passes through branch line 98 to pump 14 and thence through line 102 to inlet 78 of catholyte chamber 30. The other portion of deionized water passes through branch line 100 into inlet 104 of briner 12. Saturated brine is discharged outwardly from the briner at discharge outlet 106 through line 108, to pump 16 and thence through line 110 to inlet 82 of anolyte chamber 32. In one operative arrangement of the system, the briner simply comprises a 50 gallon polyethylene drum filled at least one third full with water softener salt pellets, although other types of briner arrangements could also be advantageously employed if desired without in any way departing from the concepts of the present invention.

A branch line 120 is connected to outlet 80 of the catholyte chamber and a branch line 122 is connected to outlet 84 of the anolyte chamber with these two branches then being joined together to form a single pool feed line 124. The products of electrolysis are mixed in line 124 and then ultimately conveyed to the pool water through the pool pumping system for chlorination purposes. Particular note and attention is invited to the fact that the products of electrolysis are joined or mixed externally of cell 22 as such an arrangement has been found to provide better overall results in the desired sodium hypochlorite production.

Electrical energy source 18 may comprise a conventional household alternating current source which is connected to pumps 14, 16 to provide electrical energy therefor. Moreover, the energy source is passed to and through rectifier 20 and then outwardly therefrom through lines 132, 134 as direct current to be connected to negative (−) terminal 42 of the catholyte chamber and positive (+) terminal 52 or the anolyte chamber, respectively. A conventional timer mechanism 136 may be included adjacent the source of electrical energy for controlling operation of the pumps and cell as may be desired. In the alternative, it is possible to connect energy source 18 directly to the main timer for the pool pumping system so as to maintain coordination between the pool pumping and chlorinator systems. Furthermore, rectifier 20 preferably includes conventional means as a part thereof for controlling the electrical energy passing therefrom through leads 132, 134 in order that the current passing through the cell may be controlled. The various components as outlined above are of a size and may be disposed such that the system is conveniently locatable adjacent the pool as an on-side installation.

In operation, and with the above noted preferred sizes and capacities, pumps 14, 16 are such that approximately 29 ml of deionized $H_2O$ per minute is pumped through line 102 into catholyte chamber 30 and approximately 29 ml of saturated brine solution per minute is pumped through line 110 into anolyte chamber 32. During cell operation, NaOH, $H_2$ and $H_2O$ are generated in the catholyte chamber and pass outwardly therefrom through outlet 80. At the same time, $Cl_2$ and $O_2$ are generated in the anolyte chamber and pass outwardly therefrom through outlet 84. These products of electrolysis are conducted by branch lines 120, 122 to line 124 where they combine and react with each other to product NaOCl, NaCl, $H_2O$ and $H_2$. These products are then conveyed to the pool water in the manner described hereinabove to obtain the biocidal benefits therefrom.

In the preferred arrangement, the briner is such that the saturated brine solution introduced into the anolyte chamber at inlet 82 has an NaCl concentration of approximately 310 gpl. With a current of approximately 75 amps passing through the cell from terminals 42, 52, the $Cl_2$ product of electrolysis will have a concentration of approximately 24 gpl and will be equal to approximately 4.5 lbs of $Cl_2$ per day (maximum). The above described system was installed for use with a 40,000 gallon pool with a design criteria that 1 lb. of $Cl_2$ is required for each 10,000 gallons of pool water. If no decomposition takes place, this equates to approximately 12ppm $Cl_2$ in the pool. Since decomposition is related to variable factors such as pool usage, amount of sunlight and so on, it is impossible to precisely predict the actual $Cl_2$ requirement. The recommended residual level of free $Cl_2$ is 1-2ppm. In the event that the $Cl_2$ production under the operating criteria set forth above is too great, it may easily be reduced by lowering the amperage to less than 75 amps and/or reducing the liquid flow into the cell until a more acceptable $Cl_2$ production rate is obtained whereby the concentration thereof in the pool may be maintained at a recommended or acceptable residual level.

Attention is invited to FIG. 3 which shows a graph with chlorine production in lbs. of $Cl_2$ per day plotted along the ordinate and current in amps plotted along the abscissa. The theoretical $Cl_2$ production is identified by line $a$; line $b$ is actual $Cl_2$ production with 60 ml/min product flow; line $c$ is the actual $Cl_2$ production with 40 ml/min product flow; line $d$ is the actual $Cl_2$ production with 30 ml/min product flow; line $e$ is the actual $Cl_2$ production with 20 ml/min product flow; and, line $f$ is the actual $Cl_2$ production for 10 ml/min product flow. Thus, a wide range of $Cl_2$ production may be obtained by simply varying the product flow or amperage parameters in the overall system.

The invention has been described with reference to the preferred embodiment. Obviously, modifications and alterations will occur to others upon the reading and understanding of the specification. For example, it is possible to practice the present invention by using a membrane type cell having a plurality of bipolar electrodes and therefore anolyte and catholyte chambers. It is our intention to include all such modifications and alterations insofar as they come within the scope of the appended claims or the equivalents thereof.

Having thus described our invention, we now claim:

1. A swimming pool chlorinator system comprising in combination:
    an ion exchange column including an inlet for receiving a supply of water therein and an outlet for discharging deionized water therefrom;
    a briner adapted to receive a portion of said deionized water and convert same to a saturated brine solution;
    a single monopolar electrolytic membrane cell having opposed catholyte and anolyte chambers which respectively include an expanded mesh cathode and an unflattened large mesh anode member with said members disposed in a close spaced parallel relationship to each other and separated by a substantially hydraulically impermeable cation exchange membrane, said catholyte chamber including an inlet for receiving a portion of said deionized water discharged from said ion exchange column outlet therein in communication with said cathode and an outlet for discharging sodium hydroxide therefrom during operation of said cell, said anolyte chamber including an inlet for receiving said brine solution from said briner therein in communication with said anode and an outlet for discharging chlorine during operation of said cell;
    means for supplying a voltage differential across said cathode and anode to generate a current flow through said cell and effect electrolysis therein;
    means for selectively varying the current flow through said cell for controlling the amount of sodium hypochlorite electrolytically produced for introduction into the water of said swimming pool;
    means for connecting said catholyte and anolyte chamber outlets externally of said cell such that the individual products of electrolysis discharged from said chambers therethrough may be mixed together forming sodium hypochlorite for introduction into the water of said swimming pool;
    a first pump adjacent said catholyte chamber inlet for pumping said deionized water thereinto and a second pump adjacent said anolyte chamber inlet for pumping said saturated brine solution thereinto;
    and means for conveying said sodium hypochlorite to a pumping system for said swimming pool.

2. The system as defined in claim 1 further including a water pressure reducer adjacent said ion exchange column inlet.

3. The system as defined in claim 1 further including timer means for selectively controlling operation of said system for producing sodium hypochlorite in response to some predetermined condition.

* * * * *